INVENTORS.
CHARLES R. SEASHORE
HENRY W. TENBROEK
BY Charles J. Ungermach
ATTORNEY

United States Patent Office 3,460,066
Patented Aug. 5, 1969

3,460,066
CONTROL SIGNAL APPARATUS FOR AIRCRAFT
Charles R. Seashore and Henry W. Tenbroek, Minneapolis, Minn., assignors to Honeywell Inc., Minneapolis, Minn., a corporation of Delaware
Filed June 30, 1966, Ser. No. 561,902
Int. Cl. G08s 5/02
U.S. Cl. 340—26                                        7 Claims

---

ABSTRACT OF THE DISCLOSURE

The present invention relates to apparatus to guide a craft along a predetermined course and more particularly to a landing system for guiding aircraft accurately to the beginning of a landing strip. Although the invention is described herein in terms of a system to land aircraft, it should be understood that the apparatus disclosed is useful for any type of guidance operation, and any type of vehicle or craft.

---

Prior art landing systems have utilized radar apparatus to track the aircraft, determine its position, and relay this information to the aircraft by a radio link. Equipment of this sort is expensive, complicated, and clumsy and is unsuitable for anything but large volume use. The present invention, on the contrary, utilizes inexpensive equipment which may be easily installed in any craft with a minimum of complexity. Briefly, the invention comprises the utilization of antennas mounted on the landing aircraft to track the electric or electrostatic field of two charged wires which extend out from the beginning of the runway being approached. At certain points between and above the wires, the electrostatic fields of both wires have zero vertical components. The antennas mounted on the aircraft are utilized to detect the zero vertical components and provide a signal for use with signal analyzing circuitry to track these points in space and thus provide an output for controlling the landing of the craft.

Accordingly, it is an object of the present invention to provide a landing system which is simple in mechanization and low in cost.

It is a further object of our invention to provide a landing system which is relatively immune to atmospheric interference.

Still another object of the present invention is to provide a landing system which may be rapidly set up at unimproved air strips by unskilled personnel.

For a more complete understanding of the invention, its objects and advantages, reference should be had to the accompanying detailed description and drawings in which.

Figure 1:
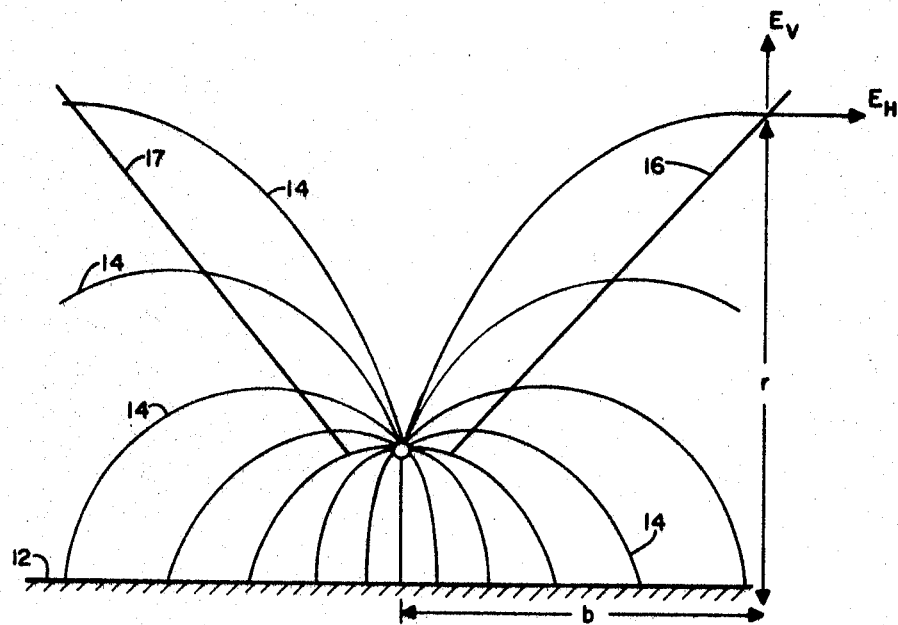
FIGURE 1 is a schematic drawing graphically illustrating the configuration of an electrostatic field about a charged wire.

Referring to FIGURE 1, a wire conductor 10 is shown which is orientated perpendicular to the plane of the paper. It has been experimentally found that wire 10 may be conveniently placed about four feet above the ground 12, although other heights may be used. The configuration of the electrostatic field about wire 10 when wire 10 is at a higher voltage than the ground is shown by lines of force or direction lines 14 which indicate the direction of the field gradient or decreasing potential. It should be noted that all of the direction lines emanating from wire 10 when wire 10 is charged, except the line that goes directly vertical, gradually curve so as to connect the charged wire 10 to ground 12 and, thus, the potential varies from that of the wire to zero at the ground in the manner and directions shown. As the direction lines curve, each one has a point at which it and the field at that point are perfectly horizontal to the earth. At these points, there are no vertical field components. If all of these points are connected, two straight lines will be formed which extend through the field at an angle of 45 degrees on each side of the charged wire 10. In FIGURE 1, these 45 degree lines are shown and indicated by the numerals 16 and 17. It should be noted that the 45 degree line which represents the locus of all points at which the field of the wire has no vertical component is clearly defined in any area which is a reasonable distance from the charged wire 10. This phenomenon may be derived mathematically. The magnitude of the electric field in a vertical direction at any given point may be described by the following equation:

$$E_v = \frac{\lambda h}{2\pi e r^2}\left[\frac{1-(b/r)^2}{[1+(b/r)^2]^2}\right] \quad (1)$$

where $r$ is the height of the given point above the ground and $b$ is the horizontal distance of the given point from the wire 10. Equation 1 is derived on page 46 of Introduction to Electronic Fields, by Walter E. Rogers, McGraw-Hill, 1954. Inspection of Equation 1 will demonstrate that $E_v$, the vertical component of the electric field, will be equal to zero whenever $b$ is equal to $r$. Reference to FIGURE 1 will demonstrate that the condition that $b$ be equal to $r$ describes the locus of points defining two 45 degree angle lines which extend generally away from charged wire 10. In three dimensions the locus of points will define curvate planes which are inclined at about 45 degrees from the earth.

Capacitive type antennas may be mounted on the aircraft at proper points to detect the electric field from wire 10. The aircraft may then track either 45 degree line by looking for the condition where there is no vertical component to the electric field. However, in order to provide sufficient information to guide an aircraft to the end of a runway a second wire is necessary as shown in FIGURE 2.

Figure 2:
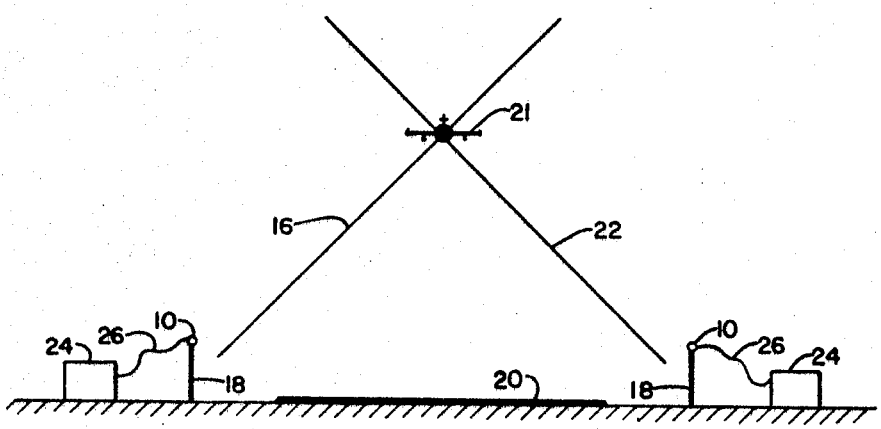
FIGURE 2 is a diagram demonstrating the positioning of the wires with respect to the runway.

FIGURE 2 is an end view of a runway 20 and two electrostatic field wires 10 mounted on supports 18. Two signal generators 24 are used to repetitively charge wires 10 at two frequencies $F_1$ and $F_2$ to a high voltage by means of conductors 26. It should be noted that in order to establish an electrostatic field no current need flow in the circuit. It is only necessary that wires 10 be at a different voltage than ground. It as been found tat 1,000 volts provides a satisfactory electrostatic field for the purposes described herein.

The voltage on each of the wires 10 is modulated in a characteristic fashion so that the electrostatic field from one wire may be distinguished from the electrostatic field of the other wire. It has been found convenient to modulate the voltage on one wire at 900 cycles per second ($F_1$) and the voltage on the other at 1300 cycles per second ($F_2$). Of course, many other methods may be used to characterize the electrostatic fields so that they may be distinguished.

As shown in FIGURE 2, each charge of wire 10 produces a 45 degree line, shown as lines 16 and 22, which represents the locus of zero vertical component points. The present invention uses only the intersecting 45 degree lines. The other two lines are not used. Lines 16 and 22 cross at a predetermined distance above the runway 20.

This vertical distance from runway 20 will vary with the distance between the charged wires 10 and will equal approximately one half of the distance therebetween.

In FIGURE 2, an aircraft 21 is shown. Aircraft 21 may, by tracking the point in space where there are no vertical components from *either* electrostatic field, follow the intersection of the 45 degree line 16 with the 45 degree line 22. As the wires extend from the beginning of the runway, they are caused to be spaced farther apart thus defining a gradual sloping glide path for the aircraft to follow toward the beginning of the runway. This is more graphically illustrated in FIGURE 3.

Figure 3:
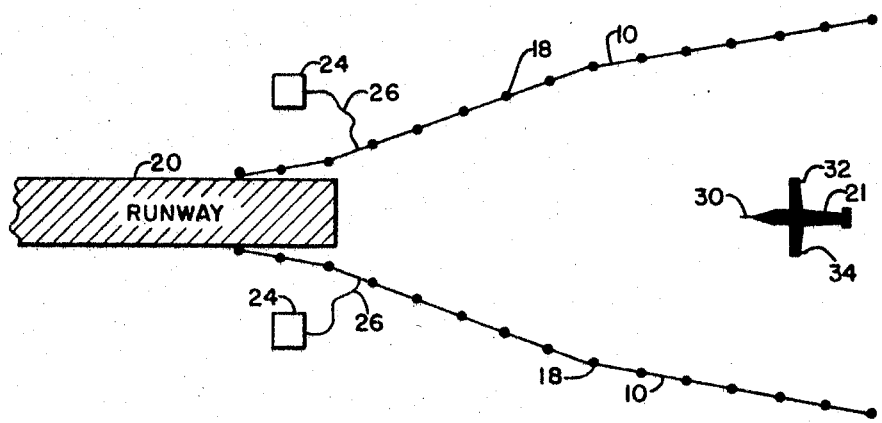
FIGURE 3 is a top view of the apparatus of FIGURE 2.

In FIGURE 3, all the elements of FIGURE 2 are shown as seen from above. Aircraft 21 is shown tracking the two 45 degree lines toward the beginning of runway 20. As wires 10 draw closer together, the intersection of the two 45 degree planes grows lower and lower until finally the aircraft is only a few feet above the runway. In three dimensions, each wire defines a curvate plane which planes intersect in space to form a curvate line along which the aircraft 21 may track.

In order to sense the electrostatic field, the present invention employs three capacitive type probe antennas. One antenna is mounted in the nose and is indicated in FIGURE 3 by the numeral 30. The remaining two antennas are mounted at the wing tips and are indicated by the numerals 32 and 34. These antennas may be integrated into the functional surfaces of the aircraft so that the dynamic performance of the airplane is not altered. Each probe operates in conjunction with the whole body of the airplane to form an elestrostatic field sensor which has a predetermined sensitive axis with respect to the airplane. The location of the antennas is important because the antenna sensitivity to components of the electric field along the wings and perpendicular to the wings is determined mostly by the shape of the aircraft and not the shape or configuration of the antennas themselves. This is true because of the nature of these type of antennas. Whenever two separate insulated pieces of metal are placed in an electrostatic field, the piece which is in a generally higher potential area (i.e., closer to a wire along a direction line) will have a higher voltage and a signal may be sensed between the two pieces. That is, each piece of metal, being a conductor, will assume the local potential of the field. If the piece is of irregular shape, such as an airplane body, it will assume the average voltage value of the field over its surface. If the direction lines of the field run directly between the two pieces, generally perpendicular to a line connecting the two pieces, then both pieces will be at approximately the same potential and no signal will be sensed between them. In other words, the two pieces will be insensitive to fields which are generally perpendicular to a line connecting them. On the other hand, the two pieces of metal will be quite sensitive to fields which lie in the same direction as a line generally connecting the two pieces. A more detailed discussion of the effects of conductors in electric fields may be found in Electromagnetic Fields, volume I, by Ernest Weber, John Wiley & Sons, 1950, pages 169–177.

The present invention incorporates three pairs of metal bodies; namely, the nose antenna and the airplane body, the left wing tip antenna and the airplane body, and the right wing tip antenna and the airplane body. It has been found that proper positioning of the antennas relative to the body of the plane will make them sensitive only to fields in predetermined directions relative to the airplane. The wing tip antennas are made sensitive to field components along the wings, which will be defined herein as the Y direction, to the field components which are perpendicular to the plane of the wings, which will be termed the Z direction, and insensitive to fields along the fuselage of the craft, herein called the X direction. The nose antenna is constructed so as to be sensitive to the field components along the fuselage in the X direction and to the Z component. The wing tip antennas being on opposite sides of the airplane body will sense field components along the wings with opposite polarity but since they are both positioned generally below the body of the airplane they will sense the Z component with the same polarity.

Figure 4:
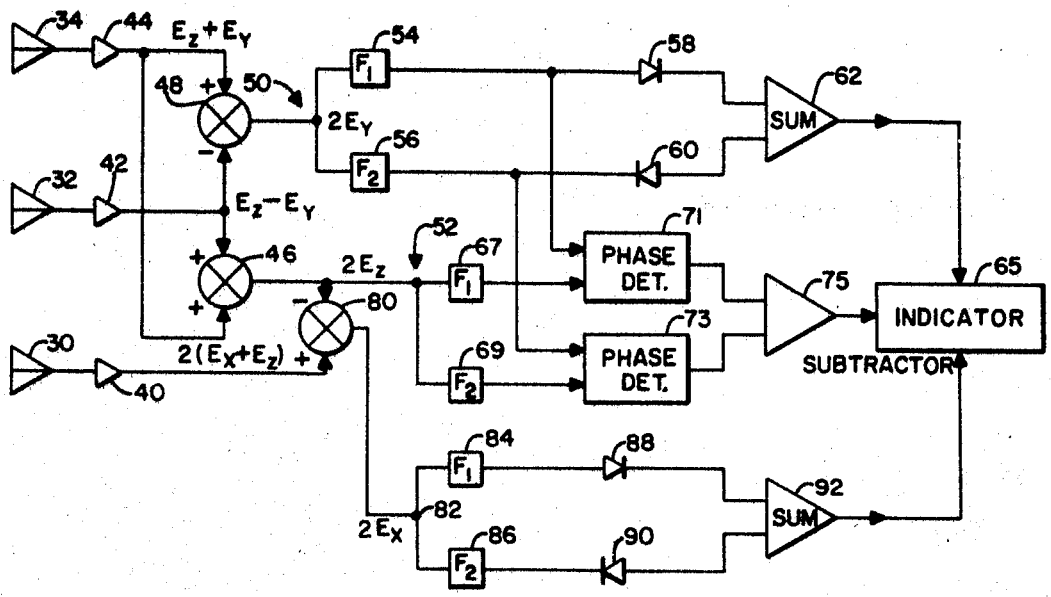
FIGURE 4 is a schematic drawing showing one possible arrangement of the signal analyzing electronics.

The signals from the antennas may be conventiently analyzed by the circuitry shown in FIGURE 4. In FIGURE 4, the three antennas 30, 32, 34 mounted on aircraft 21 are schematically shown. Since the signals from the antennas are affected by irregularities in the shape of the airplane small corrections may be necessary to achieve equal signals from both wires when the plane is on course. To accomplish this, three correcting amplifiers 40, 42, and 44 may be used to adjust the signals to their proper strength so that when the airplane is on course the electric field components along the wings, $E_y$, and the components perpendicular to the wings, $E_z$, will be equal, from both wing tip antennas. The signal from antenna 34 and correcting amplifier 44 is proportional to the two components $E_z$ and $E_y$ from each wire. This signal may be thought of as $E_z+E_y$ at frequency $F_1$ for the first wire and $E_z+E_y$ at frequency $F_2$ for the second wire. Antenna 32 and correcting amplifier 42 supply two signals of frequency $F_1$ and $F_2$ which relative to the first signal are described as $E_z-E_y$ since the wing tip antennas sense the $E_y$ components with opposite polarity or phase. A summing means 46 and a subtracting means 48 are employed to take the sums of the two signals from antenna 32 and 34 and the difference between the two signals from antenna 32 and 34. The result, at point 50 in the circuit, is a signal proportional to twice the $E_y$ component for both frequencies. At point 52 in the circuit, a signal proportional to twice the vertical component $E_z$ for both frequencies is present.

If the aircraft leaves the intersection point of the two 45 degree lines and flies closer to one wire than the other wire a stronger horizontal component $E_h$ will be detected from the nearer wire. In order to detect this condition, the signal at point 50 is separated by a pair of filters 54 and 56 so that the $E_y$ signal of each frequency from each wire may be detected independently. As long as the aircraft is level the $E_h$ component will lie along the wings and be detected as $E_y$ signals. These separate signals are rectified by a pair of diodes 58 and 60 and the resulting DC signals are applied to a summing amplifier 62. Thus, if the aircraft is closer to the wire whose field is being generated at a frequency $F_1$, a greater magnitude signal will be received and passed by filter 54 and a larger positive DC current will be applied to summing amplifier 62 by diode 58. The resultant output signal from amplifier 62 will be positive indicating by means of an indicator 65 that the craft is too close to the wire of frequency $F_1$.

Indicator 65 may comprise a variety of different devices. One possibility for use in this preferred embodiment is a simple television tube type of indication. The signal from amplifier 62 may be applied to the horizontal deflection plates so that a spot of light on the face of the tube will move left or right of a predetermined position to indicate an incorrect horizontal position.

Vertical information is obtained by processing the signal at point 52. If the aircraft is above the intersection point the $E_v$ from both fields will have a magnitude proportional to the distance above the intersection point of a first phase. If the aircraft is too low, both $E_v$ components will be of the opposite phase. If the craft is level, the signals from each wire are detected as $E_z$ signals which are separated by a pair of filters 67 and 69. The signal from filter 67, of frequency $F_1$, is presented to a phase detector 71 along with a reference signal from $E_y$ filter 54. Phase detector 71 has a DC output proportional to the smaller of the two signals and of a sign dependent on whether the input signals are in phase or out of phase. A phase detector 73 operates in the same fashion to compare the $E_y$ and the $E_z$ signals of frequency $F_2$. The two DC output signals from phase detectors 71 and 73 are presented to a subtracting amplifier 75, and the signal from amplifier 75 is presented to indicator 65.

$E_z$ is normally relatively small with respect to $E_y$ in the region about the intersection of the two 45 degree lines due to the configuration of the fields and the antennas. Thus, phase detectors 71 and 73 produce output voltages proportional to the smaller input signals $E_z$. Reference to FIGURES 1 and 2 will demonstrate that in the normal operating area between the two wires the horizontal $E_y$ components from the two wires are in opposite direction. That is, the direction lines from each wire have a horizontal component toward the other wire and in opposite directions. Consequently, the components received by the filters 54 and 56 are of opposite phase. The $E_z$ components, however, are of the same phase although this phase changes depending on whether the airplane is above or below the intersection point. If the aircraft is at the intersection of the two 45 degree lines so that both $E_z$ signals are zero, the phase detectors will generate zero signals and the output of subtracting amplifier 75 will be zero. Thus, the indicator 65 will indicate no displacement of the craft from the course. If the aircraft is above the intersection point both of the $E_z$ components increase with the same phase so that, if the aircraft is substantially level, the $E_z$ signal received by detectors 71 and 73 increases with the same phase. The voltage outputs from detectors 71 and 73 accordingly increase but with opposite sign due to the fact that the inputs from filters 54 and 56 are of opposite phase from each other. That is, if the signals presented to phase detector 71 from filters 54 and 56 are of the same phase so that a positive voltage is generated by detector 71 then the signals presented to detector 73 by filters 56 and 69 will be of opposite phase so that a negative voltage is produced by detector 73. Subtracting amplifier 75 operates to subtract the negative signal from the positive which is the same as adding a positive signal to the positive signal from detector 71 so that a net positive signal is presented to indicator 65 indicative of a displacement of the craft above the intersection point.

If the craft is below the intersection point, both $E_z$ components have phases opposite to their phase above the intersection point. As a result, both $E_z$ signals passed by filters 67 and 69 are of opposite phase and the outputs of phase detectors 71 and 73 are likewise reversed. In this situation, subtracting amplifier 75 operates to subtract a positive signal from a negative so that a net negative signal is presented to indicator 65. Thus, indicator 65 receives a voltage of magnitude proportional to the error in the vertical position and of a sign dependent on whether the aircraft is too high or too low. If the aircraft is displaced too far to the side of the intersection point, the vertical information becomes slightly incorrect since when the craft is moved to the side of the $E_y$ components from filters 54 and 56 change. It is, therefore, desirable to orientate the craft to a correct horizontal position first and then orientate the craft at the correct altitude.

Nose antenna 30 may be used to provide additional information with respect to the aircraft heading. Amplifier 40 operates on the signal from antenna 30 so that the signal presented to a subtracting means 80 is equal to $2[E_x+E_z]$. A subtracting means 80 operates to subtract out the quantity $2E_z$ so that a quantity equal to $2E_x$ remains at point 82 in the circuit. As before, the separate frequencies in the signal are selected out by a pair of filters 84 and 86 and the resultant signals are rectified by a pair of diodes 88 and 90. A summing amplifier 92 adds the resultant positive and negative DC currents. Due to the symmetry of the ground wires and the fields, the $E_x$ components of both fields should be equal when the plane is flying on a correct heading. In this condition, the positive and negative inputs of summing amplifier 92 will be equal, and, consequently, the output of amplifier 92 will be zero. If they are not equal, the resultant positive or negative output is applied to indicator 65 so that the heading information may be displayed.

Many variations may be made to our invention without departing from the novel concept disclosed. For example, the circuitry shown is only one possible approach and many other techniques may be utilized to track the intersection point of the two 45 degree lines. If desired, the wires need not end at the beginning of the runway but may extend along the runway to provide a taxiway guidance system. Since no altitude information is necessary once the aircraft has landed, only one wire need be used to guide the plane on the ground. Furthermore, it is not necessary that wires such as those described above be used to generate the desired electrostatic fields. A series of shorter segments of wires may be used. Another possible embodiment might utilize buried wires although the signal in this case would be somewhat more suppressed.

We claim:

1. Apparatus to guide a craft along a predetermined course comprising in combination:
   means for generating first and second electrostatic fields both of which have only horizontal direction lines at predetermined points, which points lie in curvate planes which are inclined approximately 45 degrees from the surface of the earth, said generating means positioned so that the curvate planes intersect to define a curvate line through space, substantially along the course that the craft is to follow;
   means to characterize said second electrostatic field so that said second field may be distinguished from said first field;
   antenna means mounted on the craft operable to sense the direction of said electrostatic fields; and
   signal analyzing means connected to said antenna means operable to sense when the horizontal components of the fields are equal and the vertical comopnents are zero so that the craft may follow the predetermined course as defined by said line through space.

2. The apparatus of claim 1 in which said generating means comprises two charged wires suspended above the ground and extending along the predetermined course; and
   said characterizing means comprise alternating voltage signal generators.

3. An aircraft landing system comprising the apparatus of claim 2 wherein said antenna means includes two insulated antennas mounted on the sides of the aircraft; and
   said charged wires are positioned progressively close together as they approach the beginning of the landing area so that the intersection point of the 45 degrees planes becomes progressively lower.

4. Apparatus as defined in claim 3 wherein said signal analyzing means includes:
   means to produce a first signal equal to the sum of the signals from said two side antennas;
   means to produce a second signal equal to the difference between the signals from said two side antennas;
   means to separate the two components of said first signal according to their characterization;
   means to compare the relative strength of said two components of said first signal as an indication of the horizontal position of the aircraft;
   means to separate the two components of said second signal according to their characterization; and
   means to compare the relative phase and strength of said two components of said second signal as an indication of the vertical position of the aircraft.

5. Apparatus to guide a craft along a predetermined course comprising in combination:
   a first conductor positioned substantially parallel to the surface of the earth;
   a second conductor substantially parallel to the surface of the earth and variably spaced from said first conductor, said first and second conductors extending substantially along the predetermined course;

means for periodically applying a charge to said first conductor at a first frequency;

means for periodically applying a charge to said second conductor at a second frequency, said charges causing first and second frequency electric fields about said first and second conductors, which fields have substantially no vertical components along a line which lies approximately mid-way between said conductors and at a distance above said conductors, which distance is proportional to the spacing of the conductor;

antenna means mounted on the craft operable to detect the directions of said first and second electric fields; and signal analyzing means connected to said antenna means operable to ascertain when the vertical components of said electric fields are at a minimum so as to permit the craft to track the line above the conductors.

6. An aircraft landing system comprising the apparatus of claim 5 wherein said antenna means includes two insulated antennas mounted on the sides of the aircraft; and said first and second conductors comprise charged wires which are positioned progressively closer together as they approach the beginning of the landing area so that said line becomes progressively lower in altitude.

7. Apparatus as defined in claim 6 wherein said signal analyzing means includes:

means to produce a first signal equal to the sum of the signals from said two side antennas;

means to produce a second signal equal to the difference between the signals from said two side antennas;

means to separate two components of said first signal according to their frequency characterization;

means to compare the relative strength of said two components of said first signal as an indication of the horizontal position of the aircraft;

means to separate two components of said second signal according to their frequency characterization; and means to compare the relative phase and strength of said two components of said second signal as an indication of the vertical position of the aircraft.

References Cited

UNITED STATES PATENTS 2,179,570  11/1939  Zublin _____ 340—26 XR

ALVIN W. WARING, Primary Examiner

U.S. Cl. X.R.

340—258; 343—108

UNITED STATES PATENT OFFICE

CERTIFICATE OF CORRECTION

Patent No. 3,460,066                Dated August 5, 1969

Charles R. Seashore et al.

It is certified that error appears in the above-identified patent and that said Letters Patent are hereby corrected as shown below:

In the claims, claim 1, column 6, after line 29, the following sentence should be inserted:

--means to characterize said first electrostatic field;--.

SIGNED AND SEALED
APR 28 1970

(SEAL)
Attest:

Edward M. Fletcher, Jr.
Attesting Officer

WILLIAM E. SCHUYLER, JR.
Commissioner of Patents

UNITED STATES PATENT OFFICE

CERTIFICATE OF CORRECTION

Patent No. 3,460,066  Dated August 5, 1969

Charles R. Seashore et al.

It is certified that error appears in the above-identified patent and that said Letters Patent are hereby corrected as shown below:

In the claims, claim 1, column 6, after line 29, the following sentence should be inserted:

--means to characterize said first electrostatic field;--.

SIGNED AND
SEALED
APR 28 1970

(SEAL)
Attest:

Edward M. Fletcher, Jr.
Attesting Officer

WILLIAM E. SCHUYLER, JR.
Commissioner of Patents